Nov. 30, 1943.   F. HÖLTERS ET AL   2,335,675
ELECTRIC REGULATING SYSTEM
Filed Sept. 24, 1940
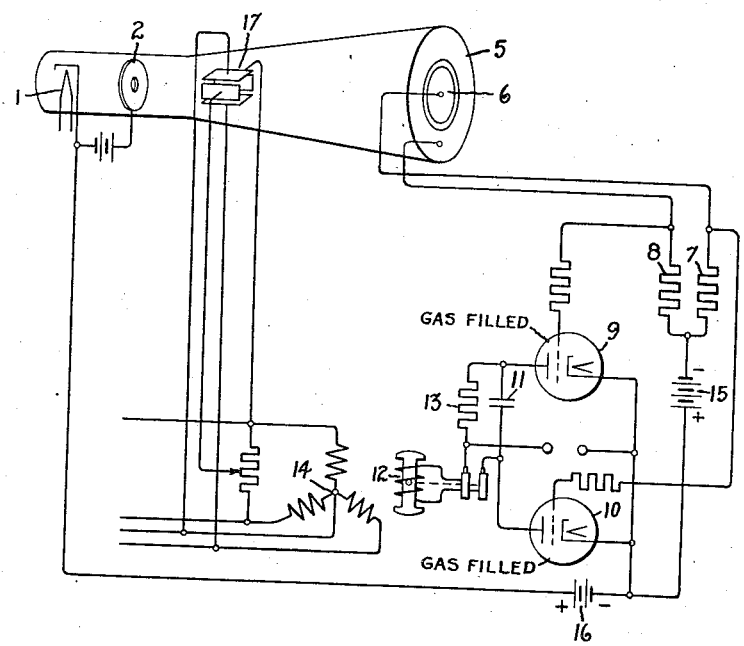
Inventors:
Friedrich Hölters,
Otto Renner,
by Harry E. Dunham
Their Attorney.

Patented Nov. 30, 1943

2,335,675

UNITED STATES PATENT OFFICE 2,335,675

ELECTRIC REGULATING SYSTEM

Friedrich Hölters, Berlin-Lankwitz, and Otto Renner, Berlin-Glienicke-Nordbahn, Germany, assignors to General Electric Company, a corporation of New York Application September 24, 1940, Serial No. 358,134
In Germany July 19, 1939

6 Claims. (Cl. 171—119)

Our invention relates to electric regulating systems and more particularly to electric valve means or electronic discharge devices for controlling electric translating apparatus.

It is an object of our invention to provide a new and improved electric control or regulating system.

It is another object of our invention to provide a new and improved regulating system for electric translating apparatus in which a Braun type tube, or a cathode-ray tube, is employed for regulating an electrical condition, such as the voltage, of an associated circuit.

Briefly stated, in the illustrated embodiment of our invention we provide a new and improved electric valve regulating system for electric translating apparatus, such as a dynamo-electric machine, in which a Braun type tube, or a cathode-ray tube, is employed as the sensitive or controlling element to energize variably the field winding of a dynamo-electric machine through translating apparatus such as electric valve means.

For a better understanding of our invention, reference may be had to the following description, taken in connection with the accompanying drawing, and its scope will be pointed out in the following claims. The single figure of the drawing diagrammatically illustrates an embodiment of our invention as applied to an excitation system for a dynamo-electric machine of the synchronous type, such as a synchronous generator.

Referring to the single figure of the drawing, we have diagrammatically illustrated our invention as applied to a system for controlling electric apparatus, such as a dynamo-electric machine, which may be an alternating current synchronous generator comprising an armature winding and a field winding.

In the electrical measuring, control and regulation field, it is frequently important to provide control means responsive to sinusoidal electrical quantities and to control and regulate associated translating apparatus in response to the variations in these quantities.

In many of the prior art arrangements, the control or regulating apparatus is limited in its field of application because of its inherent time lag in operation; that is, the prior art systems involve a predetermined time delay which in some instances have amounted to substantially one complete period of the sinusoidal electrical quantity which is being regulated. In accordance with the teachings of our invention described hereinafter, we provide a new and improved regulating system wherein the system responds substantially instantaneously to variations in the magnitude of the electrical quantity being regulated.

The present invention relates to a device which responds instantaneously to variations in the magnitude of electrical quantities.

In accordance with our invention, we employ as a controlling element of our system a Braun type tube, or a cathode-ray tube, which is capable of producing a rotating electric field of a constant value by employing a plurality of deflecting means which operate on the electron stream of the cathode-ray tube. The variable quantity to be measured or regulated is also impressed on the deflecting means, causing a modification of the path described by the electron beam and making it possible to ascertain immediately any variation in the magnitude of the electrical quantity.

The electrical quantity whose magnitude is to be controlled, regulated, or observed is visually observable as a circular path described upon the luminescent screen of the Braun tube by virtue of the image made thereon by the impinging cathode ray. The deflecting plates of the Braun tube are connected to be energized from the circuit from which the electrical quantity is derived. The radius of this circular path is, if the rotating field is constant, that is to say, if the amplitude is constant, likewise constant. This fact serves to utilise alterations of the rotating field for the regulation by means of the electron ray deflected by said alterations. For this purpose the electron ray is intended to rotate, at normal voltage of the rotating field, upon the insulated circular ring of a conducting circular disk. This disk is divided by said ring into two conducting surfaces which are electrically separated from one another, but contact with one another in the case of alterations of the rotating field according as the voltage increases or decreases. We employ conventional rectifiers or a pair of electric valve means each having an anode-cathode circuit and a grid. The anode-cathode circuits of the electric valve means are connected to the exciting winding of, for instance, a synchronous generator. The Braun tube and the electric valve means control said winding in such a manner that an increase of the voltage of the rotating field of the Braun tube causes a decreases of the exciting current, whereas a reduction of the radius of the electron beam and, therefore, a reduction of the voltage of the rotating field causes, reversely, an increase of the exciting current. There is obtained in this way, practically, a control of the excitation of the synchronous generator in the maner of a Tirrill regulator.

We provide a regulating or controlling system including an electronic discharge device, such as a Braun type tube or a cathode-ray tube, having an evacuated envelope in which are placed a plurality of principal electrodes such as a hot cathode having a heating element 1 and an anode 2 which produce an electron beam or cathode ray which is described and impinges upon, under variable conditions of operation, plates or contacts 5 and 6 which are electrically insulated from each other. These contacts may be concentric, annular contact members or segments.

In order to transmit variable amounts of unidirectional current to the field winding of the synchronous generator in response to an electrical condition thereof, such as its armature voltage, we employ translating apparatus, such as a pair of electric valves 9 and 10, each provided with an anode, a cathode and a control member or grid. The translating apparatus may be energized from a suitable source of current which may be a direct current source, and the electric valve means 9 and 10 may be arranged to operate on the Tirrill principle to control the effective value of current transmitted to the field winding 12 of the synchronous generator, thereby controlling an electrical condition such as the armature voltage thereof. As a means for effecting this Tirrill type operation, we employ a suitable commutating means such as a capacitance 11 and a resistance 13 connected between the electric valves 9 and 10. The electric valve means 10, when in a conducting condition, transmits current to the field winding 12 from the source, and when the electric valve means 9 is conducting the source of current is shunted through the resistance 13, thereby decreasing the energization of the field winding 12. The electric valves 10 and 9 are alternately rendered conducting and nonconducting, the ratio of the respective periods of conduction determining the effective value of current transmitted to the field winding 12. A negative biasing potential is impressed on the grids of the electric valves 10 and 9 by battery 15 which is connected to the grids of the electric valve means 10 and 9 through control circuits including resistances 7 and 8, respectively. The grid of the electric valve means 9 is connected to contact 6 of the cathode-ray tube through a suitable current limiting resistance, and the grid of the electric valve 10 is connected to contact 5 of the cathode-ray tube through a similar current limiting resistance.

As a means for impressing positive voltages on the control members of the electric valves 9 and 10 when such operation is dictated by the cathode-ray tube, we provide a battery 16 which impresses a positive voltage on the grids through the cathode-ray tube including contacts or segments 5 and 6.

The cathode-ray tube may be connected to be controlled in response to a predetermined operating condition, such as the armature voltage, of the synchronous generator, and one pair of the deflecting plates 17, that is opposed plates, may be connected to be energized in accordance with the line-to-line voltage of the armature winding through a suitable voltage divider having an adjustable contact. The other set of deflecting plates 17 may be connected to be energized from a voltage displaced in phase with respect to the first voltage by 90 electrical degrees, and in order to obtain this phase relationship we connect this set of deflecting plates between the neutral connection 14 of the armature winding and the other line terminal. In this manner, the voltage impressed on the respective pairs of deflecting plates is displaced 90 electrical degrees and by the adjustment of the voltage divider the path described by the electron beam at the end of the tube will be circular, the diameter or radius of which varies in dependence on the magnitude of the armature voltage.

The operation of the embodiment of our invention diagrammatically illustrated in the drawing will be explained by considering the system when it is operating as a regulating system for maintaining the armature voltage of the regulator at a substantially constant value. The beam of the cathode-ray tube is adjusted by means of the voltage divider connected across the armature circuit. The magnitudes of the voltages impressed on the two pairs of deflecting plates are equal and of a value so that the electron beam describes a circular path lying exclusively on the insulating ring when the armature voltage of the generator is at the desired value. The electron beam, through its regulating action, describes circles of varying diameters or radii continuously varying from the inner contact 6 to the outer contact 5, and thereby effecting the regulatory or controlling operation of the translating apparatus connected to the field winding 12. When the electron beam contacts one of the segments, such as segment 5, a positive impulse of voltage derived from battery 16 is impressed on the grid of electric valve 9 tending to render that valve conducting and thereby effecting a reduction in energization of field winding 12. On the other hand, if the electron beam contacts segment 6 a positive impulse of voltage is impressed on the grid of the electric valve means 10, rendering that electric valve conducting and effecting an increase in the energization of the field winding 12.

Electric valves 9 and 10 are rendered conducting alternately and the ratio of the periods of conduction determines the value of current transmitted to field winding 12. Capacitance 11 and resistance 13 serve as a means for effecting commutation of the current from one electric valve to the other.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, an alternating current circuit, electric translating apparatus for energizing said alternating current circuit and comprising a pair of control circuits and a pair of electric valves each having a control member, the control members each being connected to a different one of said control circuits, means for selectively energizing said pair of control circuits including an electron discharge device of the Braun type including an anode and a cathode for producing an electron beam, a pair of deflecting means for said electron beam, and a pair of circular insulated concentric segments each being connected to a different one of said control circuits and arranged to be selectively contacted by said electron beam, and means for energizing said deflecting means by electrically displaced alternating potentials derived from said alternating current circuit for rotating said beam in selective contact with said circular segments in accordance with said alternating current potentials and thereby to control an operating condition of said translating apparatus.

2. In combination, an alternating current circuit, electric translating apparatus for controlling an electrical condition of said alternating current circuit and comprising a pair of control circuits and a pair of electric valves each having a control member connected to a different one of said control circuits, means for controlling said control circuits comprising an electronic discharge device of the Braun type comprising an anode and a cathode for producing an electron beam, a pair of deflecting means for controlling the path of said electron beam, a pair of electrically insulated concentric segments each connected to a different one of said control circuits and arranged to be selectively contacted by said electron beam, and means for energizing said deflecting means by electrically displaced potentials derived from said alternating current circuit for rotating said beam in selective contact with said circular segments in accordance with said alternating current potentials and thereby to control said electrical condition.

3. In combination, an alternating current circuit, a pair of circuits, means for selectively energizing said pair of circuits comprising an electronic discharge device including an anode and a cathode for producng a beam of electrons, a pair of deflecting means for controlling the path of the beam and a pair of circular concentric segments insulated from each other and each connected to a different one of said pair of circuits and arranged to be contacted by said electron beam, and means for impressing phase displaced periodic voltages on said deflecting means to control said electron beam so that it describes paths of varying diameter dependent upon an electrical condition of said alternating current circuit thereby selectively establishing conducting paths through the respective circuits associated with said segments in accordance with variations in said condition.

4. In combination, an electric circuit, electric translating apparatus for controlling an electrical condition of said circuit and including a pair of electric valve means each having a control member, means for impressing a voltage on the control members to control the conductivity of said electric valve means and comprising an electronic discharge device including an anode and a cathode for producing a beam of electrons, a pair of deflecting means for controlling the path of the electron beam and a pair of insulated segments arranged to be selectively contacted by said electron beam, the control members of said pair of electric valve means being connected to a different one of said segments, and means for impressing phase displaced periodic voltages dependent upon said condition on said deflecting means to control said electron beam so that it contacts said segments selectively dependent upon said condition.

5. In combination, an electric circuit, electric translating apparatus for controlling an electrical condition of said circuit and comprising a pair of electric valve means each including a control member, means for controlling the conductivity of said electric valve means by impressing a variable control potential on the control members and comprising an electronic discharge device including an anode and a cathode for producing a beam of electrons, a pair of deflecting means for controlling the path of the electron beam and a pair of insulated segments arranged to be selectively contacted by said beam, the control members each being connected to a different one of said segments, and means for impressing phase displaced alternating voltages on the pairs of deflecting means to control said electron beam so that it contacts said segments selectively in response to said electrical condition.

6. In combination, an electric circuit, electric translating apparatus for controlling an electrical condition of said circuit comprising a pair of electric valve means each having a control member, a pair of control circuits for impressing variable voltages on the respective control members of said electric valve means, an electron discharge device including an anode and a cathode for producing a beam of electrons, a pair of deflecting means for controlling the path of the beam and a pair of insulated segments each connected to a different one of said pair of control circuits and arranged to be selectively contacted by said electron beam, and means for impressing phase displaced periodic voltages on said deflecting means which vary in magnitude in accordance with said electrical condition to direct said beam selectively on said segments.

FRIEDRICH HÖLTERS.
OTTO RENNER.